United States Patent

Nakamura et al.

Patent Number: 5,715,101
Date of Patent: Feb. 3, 1998

[54] FOCUSING APPARATUS FOR A SURVEYING INSTRUMENT

[75] Inventors: Satoru Nakamura; Yasuo Nakamura, both of Tokyo, Japan

[73] Assignees: Asahi Kogaku Kogyo K.K.; Asahi Seimitsu K.K., both of Tokyo, Japan

[21] Appl. No.: 636,954

[22] Filed: Apr. 24, 1996

[30] Foreign Application Priority Data

Apr. 26, 1995 [JP] Japan ................................. 7-102562
Feb. 29, 1996 [JP] Japan ................................. 8-043159

[51] Int. Cl.$^6$ ................................. G02B 7/02; G02B 15/14
[52] U.S. Cl. ................................. 359/823; 359/696
[58] Field of Search ................................. 359/696, 698, 359/822–825

[56] References Cited

U.S. PATENT DOCUMENTS 5,239,417  8/1993  Eguchi et al. ................................. 359/823
5,266,982  11/1993  Soshi .

Primary Examiner—David C. Nelms
Assistant Examiner—John P. Cornely
Attorney, Agent, or Firm—Greenblum & Bernstein P.L.C.

[57] ABSTRACT

A focusing apparatus for a surveying instrument including an objective lens, a focusing lens and a reticle. The focusing lens is movable in an optical axis direction, by a rotating shaft member which is rotated by a motor, to form an image, of an object to be surveyed, on the reticle. Means for detecting a focus state of the object image and for controlling the motor in accordance with the detected focus state are provided. A focusing knob, coaxial with the rotating shaft member, and movable in an axial direction thereof is also provided. A plurality of clutches disengageably engages the focusing knob or the motor with the rotating shaft member, according to an axial movement of the focusing knob.

22 Claims, 15 Drawing Sheets

FOCUSING APPARATUS FOR A SURVEYING INSTRUMENT

BACKGROUND OF THE INVENTION

1. Field of the Invention

The present invention relates to a focusing apparatus incorporated in a surveying instrument, such as an automatic level (auto-level), which adjusts a line of sight within a horizontal plane that includes a reference position.

2. Description of Related Art

An auto-level is essentially comprised of a surveyor's telescope and a horizontal plane establishing optical system (horizontal plane compensating optical system). When a reference position (sighting point), that is set at a distance from the level, is sighted through the telescope, the horizontal plane establishing optical system ensures that a horizontal fine line of a reticle of the telescope lies real horizontal, even if the optical axis of the telescope is not correctly positioned in a horizontal plane. When another sighting point is sighted after the telescope has been rotated about a vertical axis, perpendicular to the optical axis thereof, the sighting point is located in the same horizontal plane as the reference position.

The optical system of the telescope of such an auto-level is comprised of an objective lens group, a focusing lens group and an eyepiece, arranged in this order from the object side. Due to the focusing lens group, a clear image of a sighted reference object (reference point) can be observed, regardless of the object distance. The position of the focusing lens group is adjusted depending on the object distance, so as to form a sharp object image on the reticle provided on the focal plane. The object image formed on the reticle can be viewed through the eyepiece.

Assuming that the observable object distance range of the telescope is for example, 0.2M to ∞ (infinity), and that the focusing lens group comprises of a concave lens, the movement range of the focusing lens group for focusing is approximately 30 mm. The focusing lens group is usually moved along the optical axis thereof by rotating a rotatable focusing knob provided on the telescope. If the amount of movement of the focusing lens group is small relative to the angular displacement of the focusing knob, it is sometimes necessary for the focusing knob to be rotated by a large amount so as to move the focusing lens group to a position at which an in-focus condition is obtained, that is, it sometimes takes a long time to obtain an in-focus condition, though the image remains on the reticle on the focal plane for a long period of time, with respect to the amount of rotation of the focusing knob.

Conversely, if the amount of movement of the focusing lens group is large relative to the amount of rotation of the focusing knob, it is not necessary for the focusing knob to be rotated by a large amount for focusing, but the time in which the image on the reticle on the focal plane remains is too short, with respect to the amount of rotation of the focusing knob, that is, the focusing lens group moves by a large amount even when the focusing knob is rotated by a small amount. Due to this, in this latter case where the amount of movement of the focusing lens group is large relative to the amount of rotation of the focusing knob, it is difficult to obtain an in-focus condition in a quick manner since the focusing knob must be rotated a small amount at a time, resulting in a time consuming operation.

Furthermore, since it is impossible for the naked eye to judge whether the object to be sighted is in a front or rear focus state, the focusing knob is often firstly mistakenly rotated in a wrong direction.

In an auto-level, the focusing operation is automatically carried out, however, it would be convenient if the focusing operation could be selectively carried out automatically or manually in accordance with need so that the manual operation and the automatic operation could be easily and certainly switched.

SUMMARY OF THE INVENTION

It is an object of the present invention to provide a focusing apparatus for a surveying instrument, in which the focusing operation can be effected either manually or automatically, and the manual and automatic operations can be easily and certainly switched.

Another object of the present invention is to provide a focusing apparatus for a surveying instrument in which, upon switching between the manual and automatic operations no accidental rotation of the telescope, which causes the object image to move out of the field of view, occurs.

According to the present invention, there is provided a focusing apparatus for a surveying instrument including an objective lens, a focusing lens and a reticle, provided in this order from an object to be surveyed. The focusing lens is movable, in an optical axis direction thereof, so as to form an image of the object on the reticle. A rotating shaft member is rotated, by a rotation of a motor, to move the focusing lens in the optical axis direction. Means for detecting a focus state of the object image, and for accordingly controlling the motor are provided. A focusing knob, coaxial with the rotating shaft member and movable in an axial direction thereof, is also provided. A plurality of clutches disengageably engage the focusing knob or the motor with the rotating shaft member, according to an axial movement of the focusing knob.

With this arrangement, not only can an automatic focus control and a manual focus control be selectively carried out, but also the selection of the focus control mode can be easily and certainly effected by the axial movement of the focusing knob.

Preferably, the plurality of clutches includes first and second clutches, which are respectively used for an automatic and a manual focusing adjustment. When the focusing knob is moved in one axial direction, the first clutch disengages the focusing knob from the rotating shaft member and engages the motor with the rotatable shaft member. Additionally, when the focusing knob is moved in another axial direction, the second clutch disengages the motor from the rotatable shaft member and engages the focusing knob with the rotatable shaft member.

It is preferred that the axis of the focusing knob and the rotating shaft member is substantially perpendicular to the optical axis. The focusing lens is preferably provided with a rack which extends in a direction substantially parallel to the optical axis. The rack meshes with a pinion provided in the rotating shaft member. With this arrangement, the rotation of the focusing knob can be effectively transmitted to the focusing lens by a simple transmission mechanism.

If the axis of the focusing knob and the rotating shaft member is substantially perpendicular to the optical axis of the optical system, the center of gravity of the surveying instrument can be located substantially at the center of the surveying instrument by the arrangement of the focusing knob being substantially at the center of the surveying instrument in the longitudinal direction thereof. Consequently, upon operation of the focusing knob, since little or no operational force acts on the portion of the surveying instrument other than the center of gravity, the surveying instrument can be easily held horizontally.

Preferably, the first clutch is provided with a first clutch portion and a first clutch tooth portion, coaxial with the focusing knob. The first clutch portion and the first clutch tooth portion engage and disengage when the focusing knob is respectively moved in the one axial direction and the another axial direction. The second clutch is provided with a second clutch portion and a second clutch tooth portion, coaxial to the focusing knob. The second clutch portion and the second clutch tooth portion engage and disengage when the focusing knob is respectively moved in the another axial direction and the one axial direction. It is preferred that the first and second clutch tooth portions are respectively biased toward the first and second clutch portions by respective first and second springs.

If at least one of the first and second clutches is a friction clutch, the period of time in which the engagement of the clutch is completed can be shortened.

Preferably, provision is made for a click stop mechanism which engages the focusing knob at an automatic adjustment position, in which the first clutch engages, or a manual adjustment position, in which the second clutch engages. The click stop mechanism may include two adjacent click grooves provided on the outer peripheral surface of the focusing knob and two click pawls which are engaged in the corresponding click grooves when the focusing knob is moved in the axial direction. If one of the click grooves, in which the corresponding click pawl is engaged in the automatic adjustment position, is provided with at least one engaging hole in which the click pawl can be engaged, not only the positioning function to determine the axial position of the focusing knob, but also the rotation preventing function to prevent the focusing knob from rotating when the control mode is switched to the automatic control (adjustment) mode, can be achieved.

Preferably, a focusing knob moving means for moving the focusing knob in the axial direction is provided. This prevents the object which is being viewed from moving accidentally out of the field of view or the object from being out of focus, when the control mode is switched between the manual control mode and the automatic control mode.

Preferably, the focusing knob moving means includes a cylindrical rotation switching member, and a movement converting mechanism which converts the rotation of the rotation switching member into a linear movement of the focusing knob. The cylindrical rotation switching member is rotatable relative to the focusing knob, but is immovable in the axial direction.

It is preferred that the movement converting mechanism includes a linear movement guide groove, provided on a body of the surveying instrument and extending in the axial direction of the focusing knob; a lead groove, provided on the rotation switching member and inclined with respect to the axial direction; and a member to be guided, movable in the axial direction together with the focusing knob, and fitted in the linear movement guide groove and the lead groove. The member to be guided is preferably made of a linear key screw which is screw-engaged with the cylindrical member. A front end of the linear key screw projects into the cylindrical member so as to be slidably fitted in the peripheral groove.

The focusing knob is preferably provided, on an outer peripheral surface thereof, with a peripheral groove perpendicular to the optical axis direction. A cylindrical member is relatively rotatably fitted onto the focusing knob.

Preferably, the rotating shaft member is provided between the focusing lens and the motor, and the focusing knob is cylindrical.

According to another aspect of the present invention, there is provided a focusing apparatus for a surveying instrument including an objective lens, a focusing lens, a reticle and an eyepiece, for adjusting a position of the focusing lens along an optical axis thereof, so as to bring an image of an object to be surveyed into focus on the reticle. The focusing apparatus includes a means for detecting a focus state of the object image relative to the reticle. A shaft member, rotated by a motor, is provided to move the focusing lens along the optical axis. A means for controlling the motor, in accordance with the focus state detected by the detecting means; and, a focusing knob, coaxial to the rotating shaft member, and movable in an axial direction thereof, are also provided. A plurality of clutches disengageably engage the focusing knob or the motor with the rotating shaft member, according to an axial movement of the focusing knob.

According to a further aspect of the present invention, a level is provided having a focusing apparatus for adjusting a position of a focusing lens of a telescope, provided on the level, along an optical axis thereof to bring an image of an object observed through the telescope into focus. The focusing apparatus includes means for detecting a focus condition of the object image. A shaft member is rotated by a motor to move the focusing lens along the optical axis. Means for controlling the motor in accordance with the focus state detected by the detecting means, are also provided. A focusing knob is provided, coaxial to the rotating shaft member, and movable in an axial direction thereof. A first clutch disengages the focusing knob from the rotating shaft member and engages the motor with the rotating shaft member, when the focusing knob is moved in one axial direction, so that the focusing lens can be controlled by the control means. A second clutch disengages the motor from the rotating shaft member and engages the focusing knob with the rotating shaft member, when the focusing knob is moved in another axial direction, so that the focusing lens can be manually adjusted by the focusing knob.

The present disclosure relates to subject matter contained in two Japanese patent applications No. 7-102562 (filed on Apr. 26, 1995), and No. 8-43159 (filed on Feb. 29, 1996) which are expressly incorporated herein by reference in their entireties.

BRIEF DESCRIPTION OF THE DRAWINGS

The invention will be discussed below in detail with reference to the accompanying drawings, in which.

DESCRIPTION OF THE PREFERRED EMBODIMENT

Figure 8:
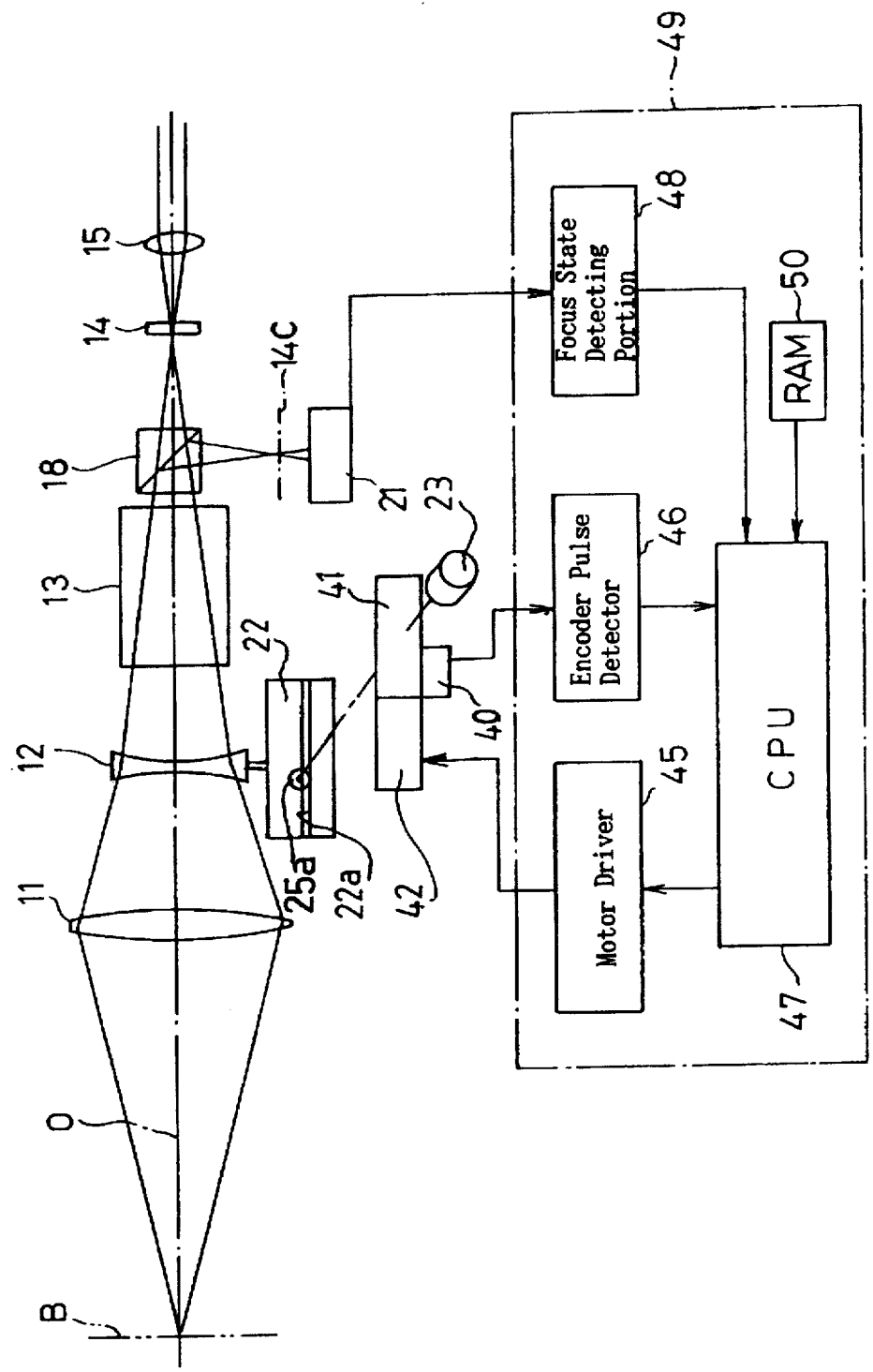
FIG. 8 is a schematic view of a surveyor's telescope and an automatic focusing system of an auto-level to which the present invention is applied.
Figure 10:
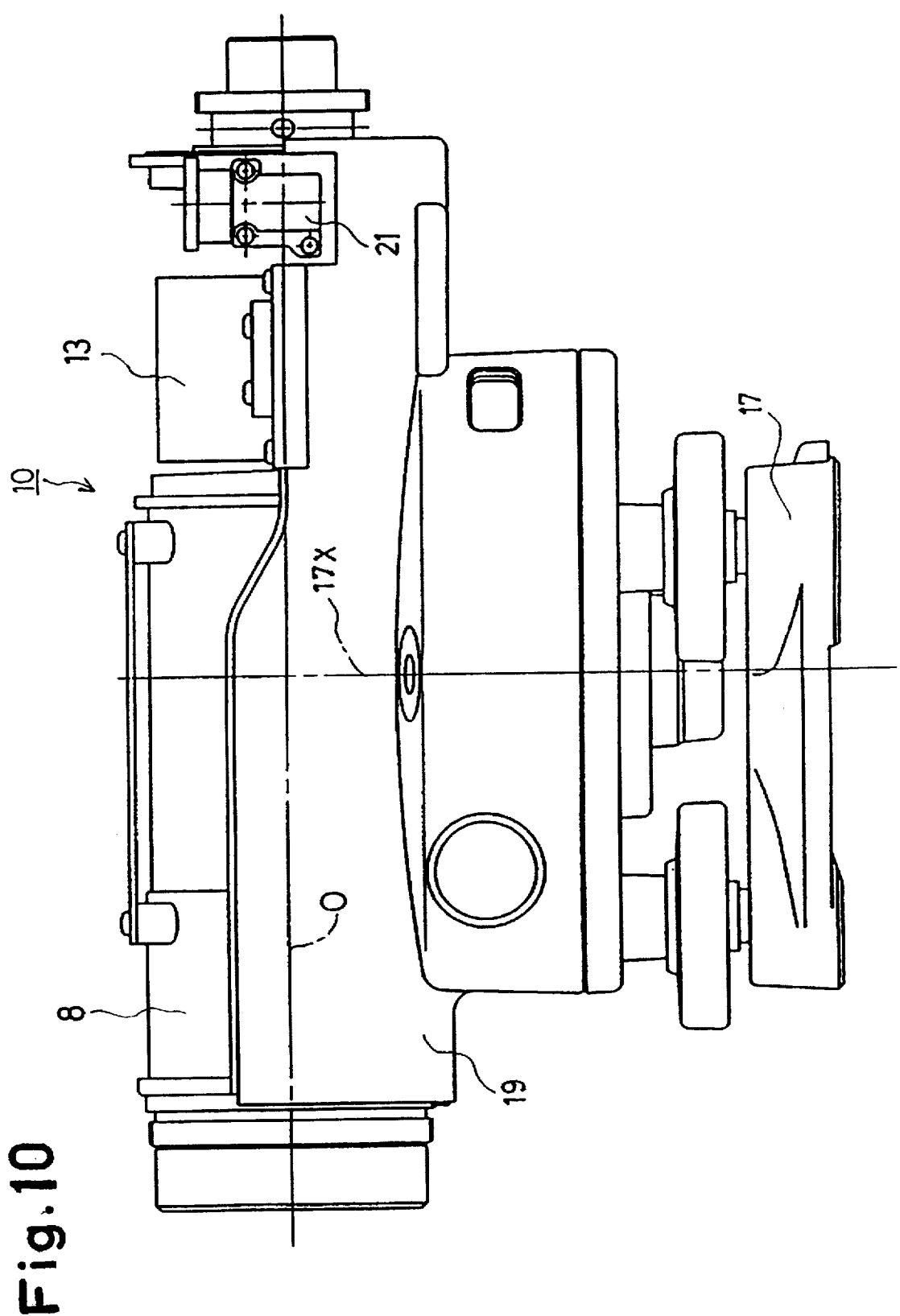
FIG. 10 is a front elevational view of an auto-level to which the present invention is applied.
Figure 11:
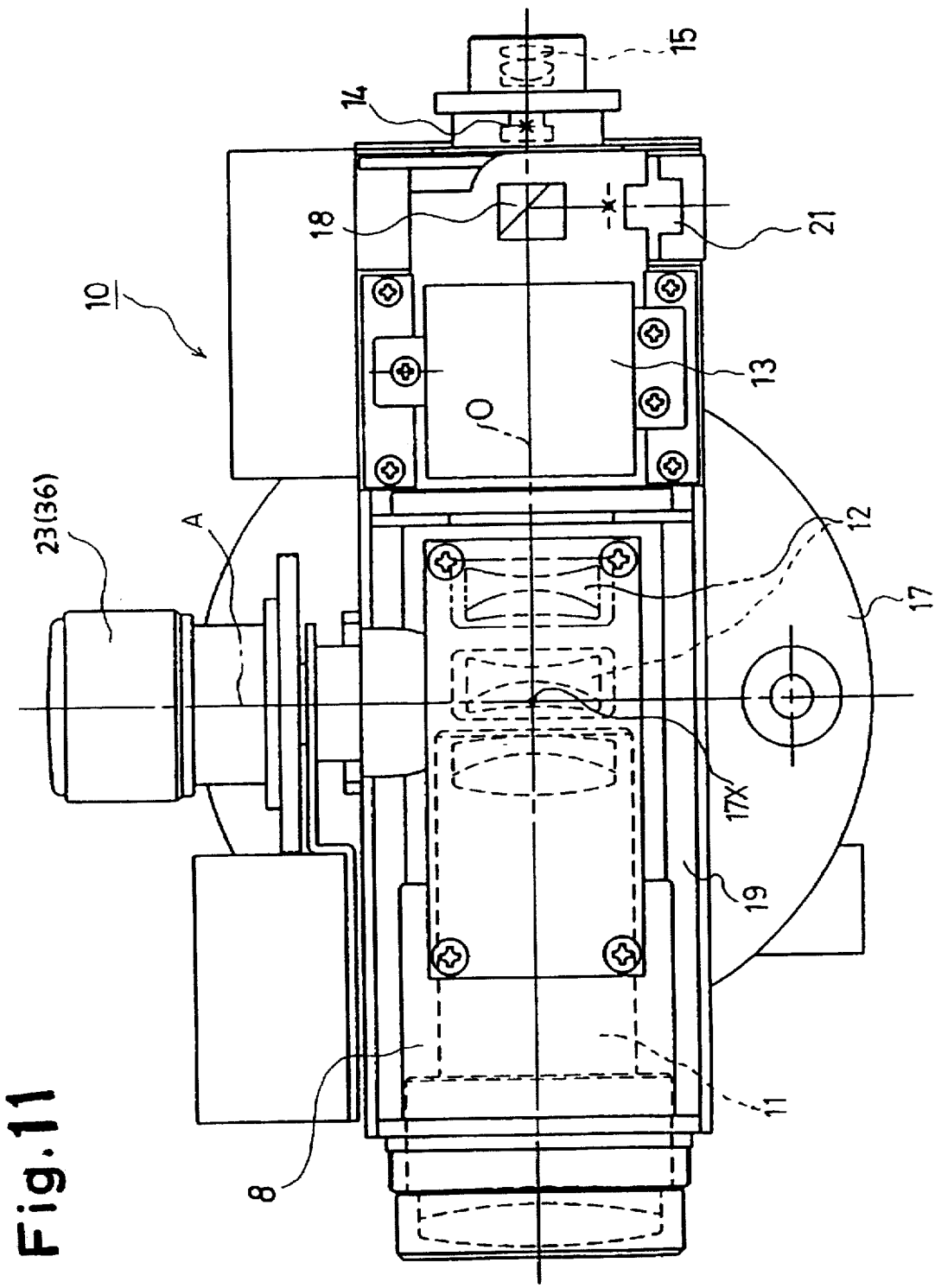
FIG. 11 is a plan view of the auto-level shown in FIG. 10.

FIGS. 10 and 11 show an auto-level 10 (surveying instrument) according to the present invention. FIG. 8 schematically shows an optical system and an automatic focus control system (autofocus system) in the auto-level 10. The auto-level 10 includes a TTL type AF (autofocus) system having a surveyor's telescope 8 which comprises an objective lens group 11 of positive power, a focusing lens group 12 of negative power, a horizontal plane establishing optical system 13, a beam splitter (semi-transparent mirror) 18, a reticle plate 14, and an eyepiece lens 15 of positive power, in this order from the object (i.e., a leveling rod B) side (i.e., left to right in FIG. 8). For the purpose of illustration, the objective lens group 11 is drawn as a single lens in FIG. 8, although it actually comprises of a plurality of lenses as shown in FIG. 11.

Figure 15:
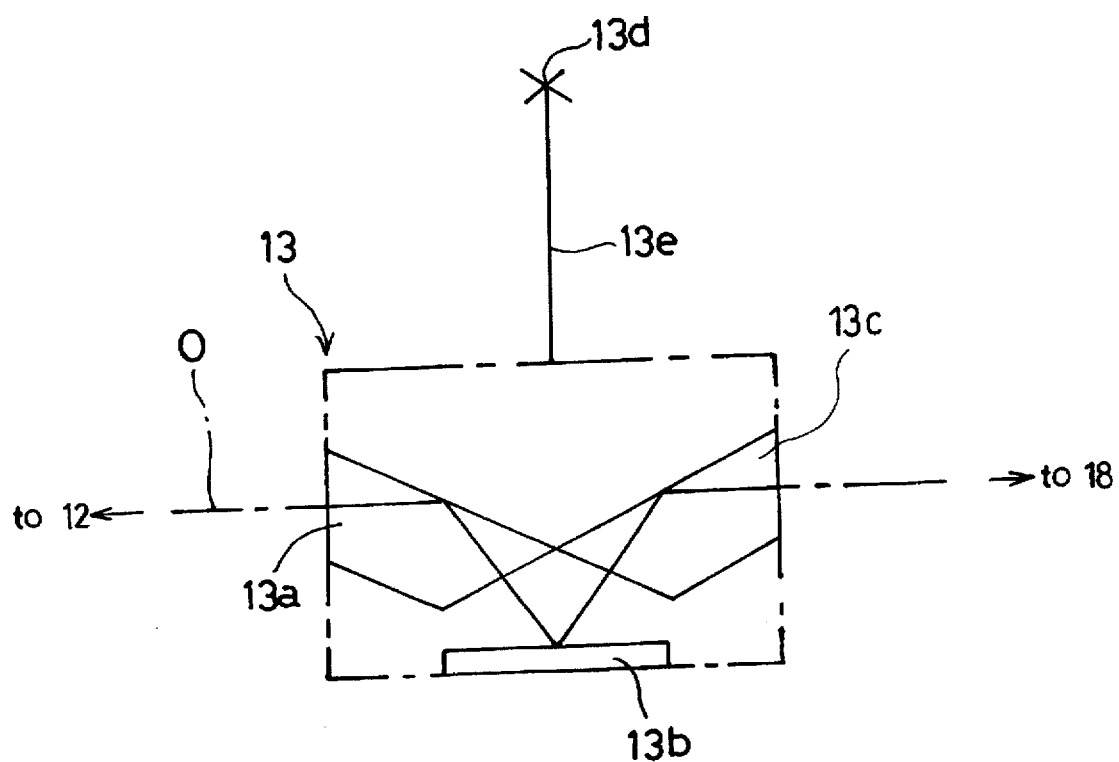

The horizontal plane establishing optical system 13, per se known, is provided, as shown in FIG. 15, with a first compensating prism 13a, a compensating mirror 13b and a second compensating prism 13c, and has a symmetrical shape with respect to the center of the compensating mirror 13b. The horizontal plane establishing optical system 13 hangs from a string 13e attached to a shaft 13d.

The surveyor's telescope 8 as constructed above has, for example, a magnification of 24 and is supported by a supporting frame 19 secured to a rotatable table 17, as shown in FIGS. 10 and 11. The rotatable table 17 is rotatable about a vertical axis 17X, which is perpendicular to the optical axis O of the telescope 8, so that objects located at different distances from the auto-level 10, but located on a common horizontal plane, can be observed through the telescope 8.

As seen in FIG. 8, the auto-level 10 further comprises a guide member 22 in which the focusing lens 12 is moved along the optical axis O, a rack 22a parallel with the optical axis O provided on the guide member 22, and a rotating shaft 25 having a pinion 25a (FIGS. 1 and 2) which is in mesh with the rack 22a. When the rotating shaft 25 is manually or automatically rotated, the focusing lens 12 is moved in the optical axis direction O to adjust the focus of the telescope 8 with respect to the leveling rod B.

Furthermore, the auto-level 10 includes a lens driving motor 42 which rotates the rotating shaft 25; a clutch-incorporated speed reduction gear mechanism 41, which transmits the rotation of the lens driving motor 42 to the rotating shaft 25; and an encoder 40. The encoder 40 outputs lens positional information in the form of pulse signals, based on the number of revolutions of a specific gear in the reduction gear mechanism 41.

A part of the light emitted from the horizontal plane establishing optical system 13 is reflected by the beam splitter 18 at right angles towards a focus detecting sensor 21 provided near the beam splitter 18. Between the beam splitter 18 and the focus detecting sensor 21 is formed an imaginary equivalent surface 14C which is located at a position optically equivalent (conjugate) to the position at which the reticle plate 14 is placed. The focus detecting sensor 21 receives light reflected by the beam splitter 18 and outputs corresponding signals to a focus state detecting portion 48.

Figure 9:
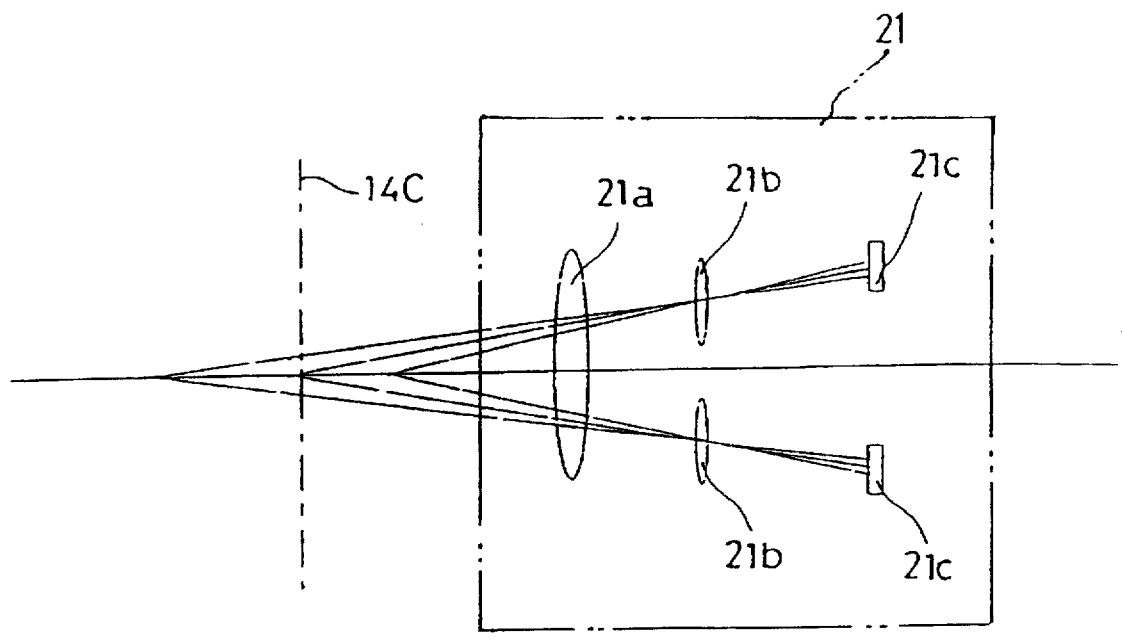
FIG. 9 is an explanatory view of a focus detecting system of an automatic focusing system.

The auto-level 10 is further provided with an AF controller 49 which includes a CPU 47, a motor driver 45, an encoder pulse detector 46, the focus state detecting portion 48 (mentioned above), and a RAM 50. The focus state on the equivalent surface 14C is detected by the focus state detecting portion 48 in accordance with the signals received from the focus detecting sensor 21. The focus detecting sensor 21, which is per se known, is shown in FIG. 9 by way of example.

The focus detecting sensor 21 consists of a condenser lens 21a, a pair of separator lenses 21b, and a pair of line sensors 21c, such as multi-segment CCD sensors, located behind the respective separator lenses 21b. The line sensors 21c are preferably arranged horizontally, i.e., along a horizontal plane perpendicular to the reference pole B. It should be noted that the reference pole B is placed on a reference point on the ground while being held.

A common object image (e.g., the reference pole B) is incident on each of the pair of line sensors 21c, when the image of the object is formed on the equivalent surface 14C (in-focus state). However, relative locations of the two object images change depending upon the location of the focal point relative to the equivalent surface 14C, i.e., when the object image is formed at a position in front of the equivalent surface 14C (front focus state) or at a position behind the equivalent surface 14C (rear focus state), the incident position on the line sensors 21c differs. Deviations from the focal position (in-focus state) can be detected, based on the image forming positions of the line sensors 21c, at which the object images are formed. Namely, the outputs of the line sensors 21c are amplified by a preamplifier (not shown) of the focus state detecting portion 48 and are calculated by a calculating circuit (not shown) thereof to detect an in-focus, a front focus or a rear focus state, and the amount of defocus, etc. The focus state detecting portion 48 outputs the detected focus state and defocus amount to the CPU 47.

The CPU 47 supplies a drive signal to the lens driving motor 42, through the motor driver 45, in accordance with defocus amount data supplied from the focus state detecting portion 48, to thereby move the focusing lens 12 in a direction so as to form the focused object image on the equivalent surface 14C. The rotation of the lens driving motor 42 is transmitted to the guide member 22 through the reduction gear mechanism 41, the rotating shaft 25 and the rack 22a. The data is then sent to the encoder pulse detector 46 as pulse data through the encoder 40. The encoder pulse detector 46 feeds-back the position of the focusing lens 12 in accordance with the pulse data, to the CPU 47 as a signal which represents the object distance when an image of the object (reference pole B) is formed on the reticle plate 14 through the focusing lens 12.

A switching mechanism, between a manual adjustment mode and an automatic adjustment mode, of the focusing apparatus will now be discussed.

Figure 5:
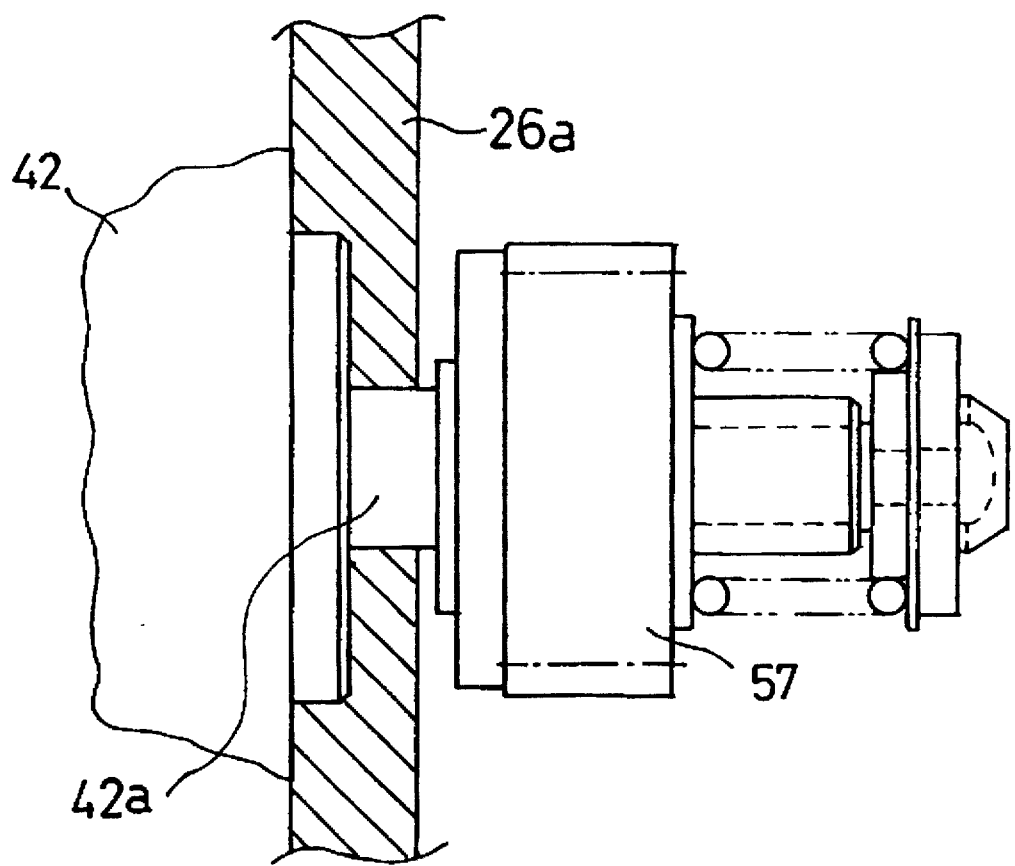
FIG. 5 is an enlarged view of the lens driving motor, secured to a support plate, of the focusing apparatus shown in FIG. 1.
Figure 6:
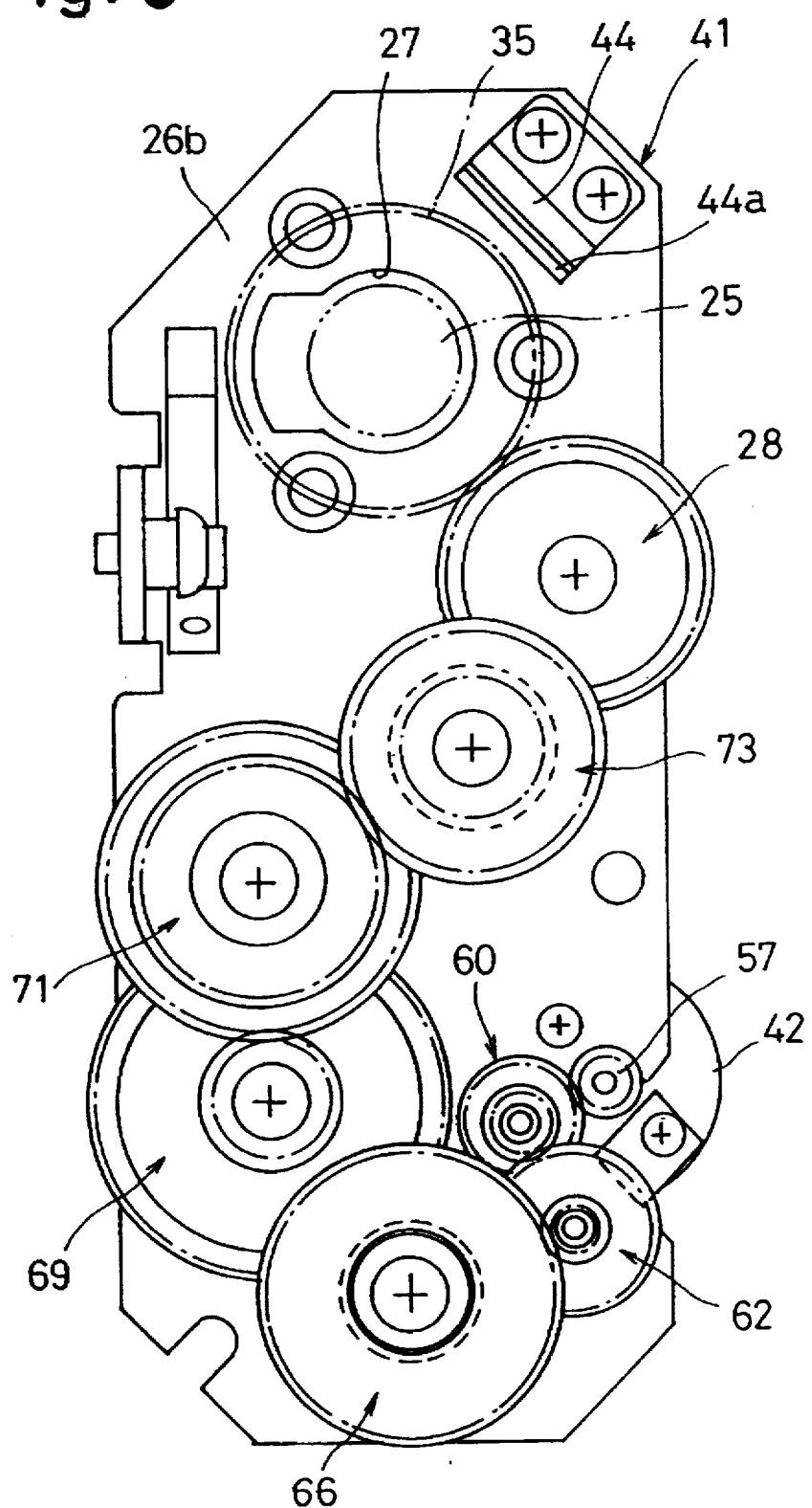
FIG. 6 is a side elevational view of the reduction mechanism, with a removed supporting plate, of the focusing apparatus shown in FIG. 1.
Figure 7:
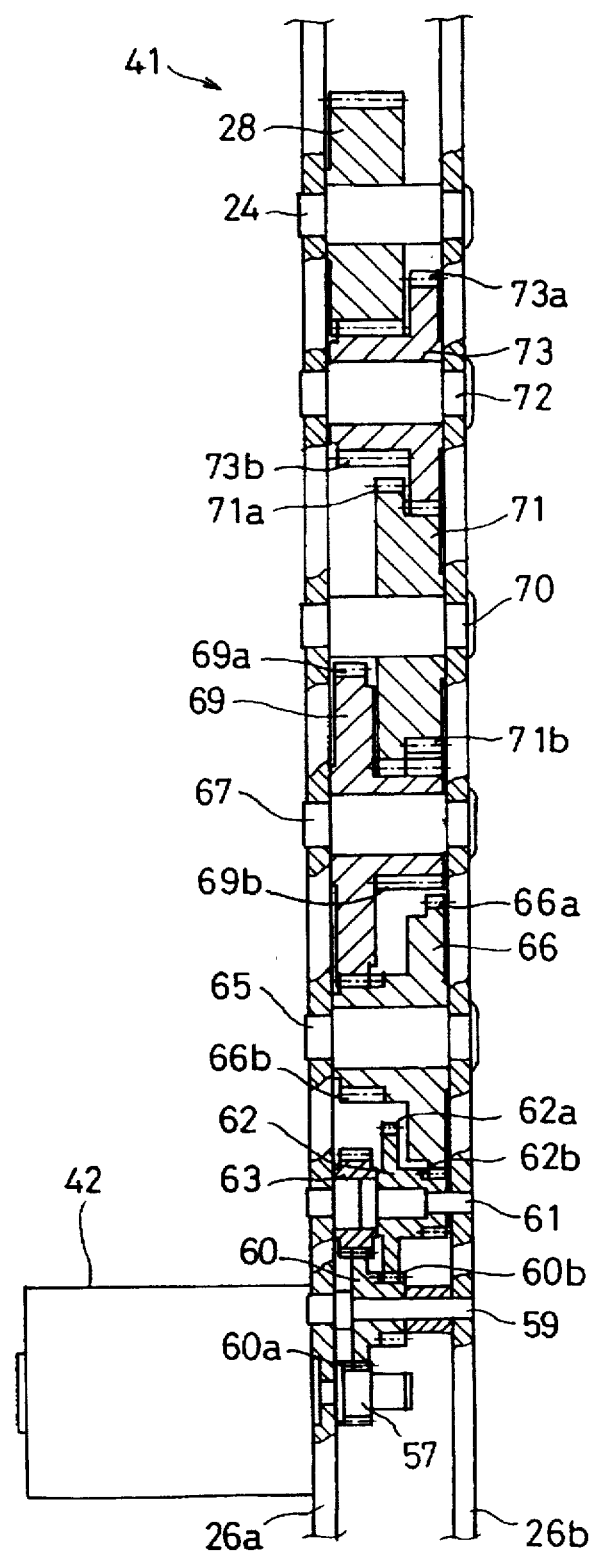
FIG. 7 is a partially developed sectional view of the lens driving motor in the focusing apparatus shown in FIG. 1.

As shown in FIGS. 6 and 7, the reduction gear mechanism 41 of the focusing apparatus is provided with a transmission gear 28 and gears 73, 71, 69, 66, 62 and 60, rotatably supported by respective shafts 24, 72, 70, 67, 65, 61, and 59, between support plates 26a and 26b secured to the body of the auto-level 10. FIG. 5 shows the lens driving motor 42 secured to the support plate 26a, so that a pinion 57, secured to a motor output shaft 42a, projects toward the support plate 26b. The pinion 57 is in mesh with a large diameter tooth portion 60a of the gear 60 which is in turn in mesh with a rotation detecting gear 63 supported by the shaft 61 coaxial with the gear 62, so that the rotation of the lens driving motor 42 is transmitted to the encoder 40 through the rotation detecting gear 63.

A small diameter tooth portion 60b, coaxial with the large diameter tooth portion 60a of the gear 60, is engaged with a large diameter tooth portion 62a of the gear 62. A small diameter tooth portion 66b, coaxial with a large diameter tooth portion 66a of the gear 66, is engaged with a large diameter tooth portion 69a of the gear 69. A small diameter tooth portion 69b, coaxial with the large diameter tooth portion 69a, is engaged with a large diameter tooth portion 71a of the gear 71. A small diameter tooth portion 71b, coaxial with the large diameter tooth portion 71a, is engaged with a large diameter tooth portion 73a of the gear 73. A small diameter tooth portion 73b, coaxial with the large diameter tooth portion 73a, is engaged with the transmission gear 28.

Figure 1:
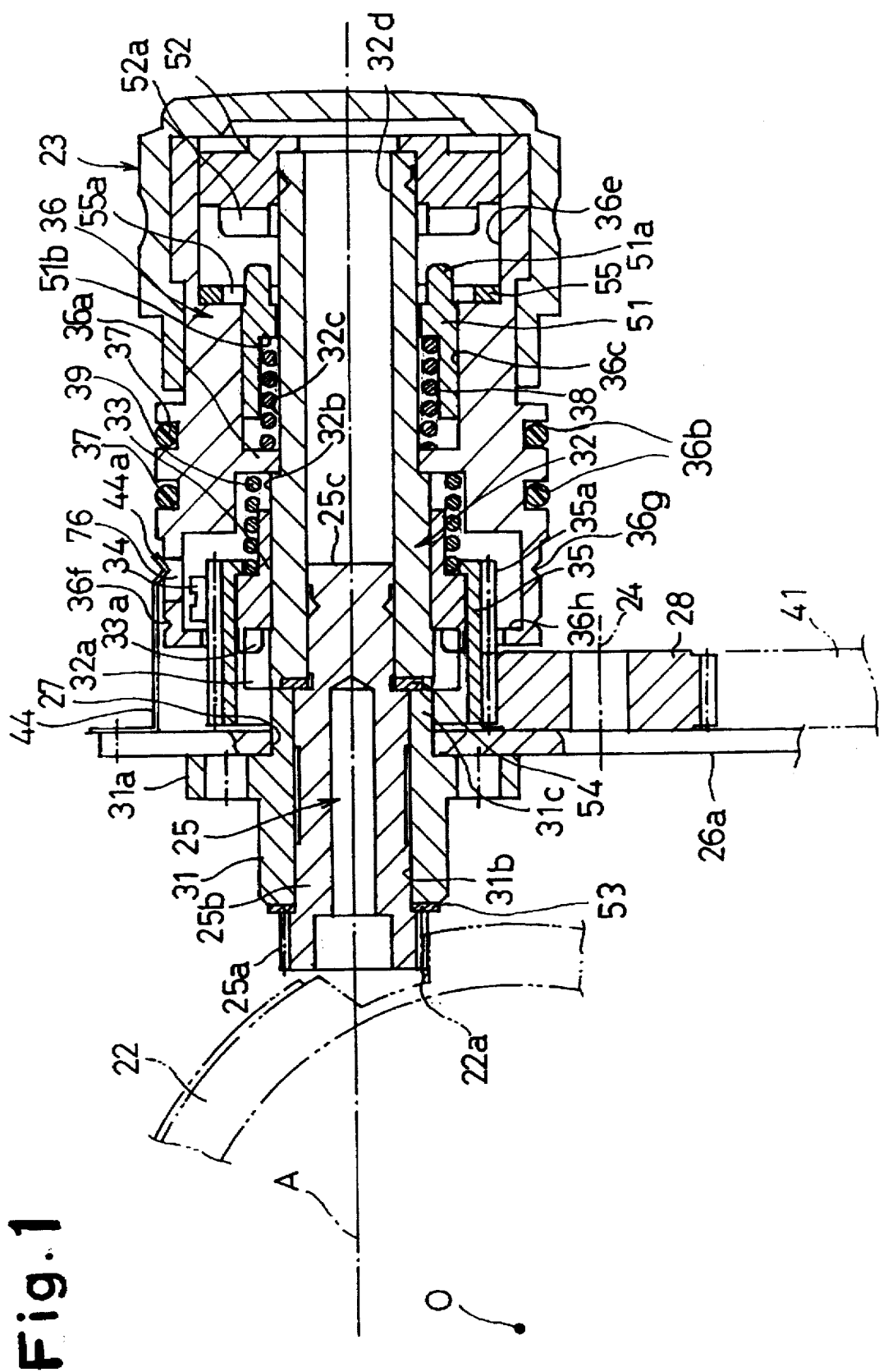
FIG. 1 is a sectional view of a first embodiment of a focusing apparatus according to an aspect of the present invention, in an automatic adjustment mode.

A bearing member 31 (FIG. 3), which is provided with a small diameter portion 31c which is fitted in an engaging hole 27 of the support plate 26a, is firmly connected to the support plate 26a by bolts (not shown) inserted through a flange portion 31a, of the bearing member 31, in the vicinity of the transmission gear 28, as shown in FIG. 1. The bearing member 31 is provided with a bearing hole 31b whose axis "A" is perpendicular to the optical axis O of the horizontal plane establishing optical system 13, having the objective lens group 11 and the focusing lens 12. A rotating shaft member 25 is provided with a shaft portion 25b which is rotatably fitted in the bearing hole 31b, so that the axis "A" is normal to the optical axis O. The rotating shaft member 25 is also provided with a pinion 25a whose diameter is larger than the bearing hole 31b and which abuts against the front end of the bearing member 31 through a washer 53.

Figure 3:
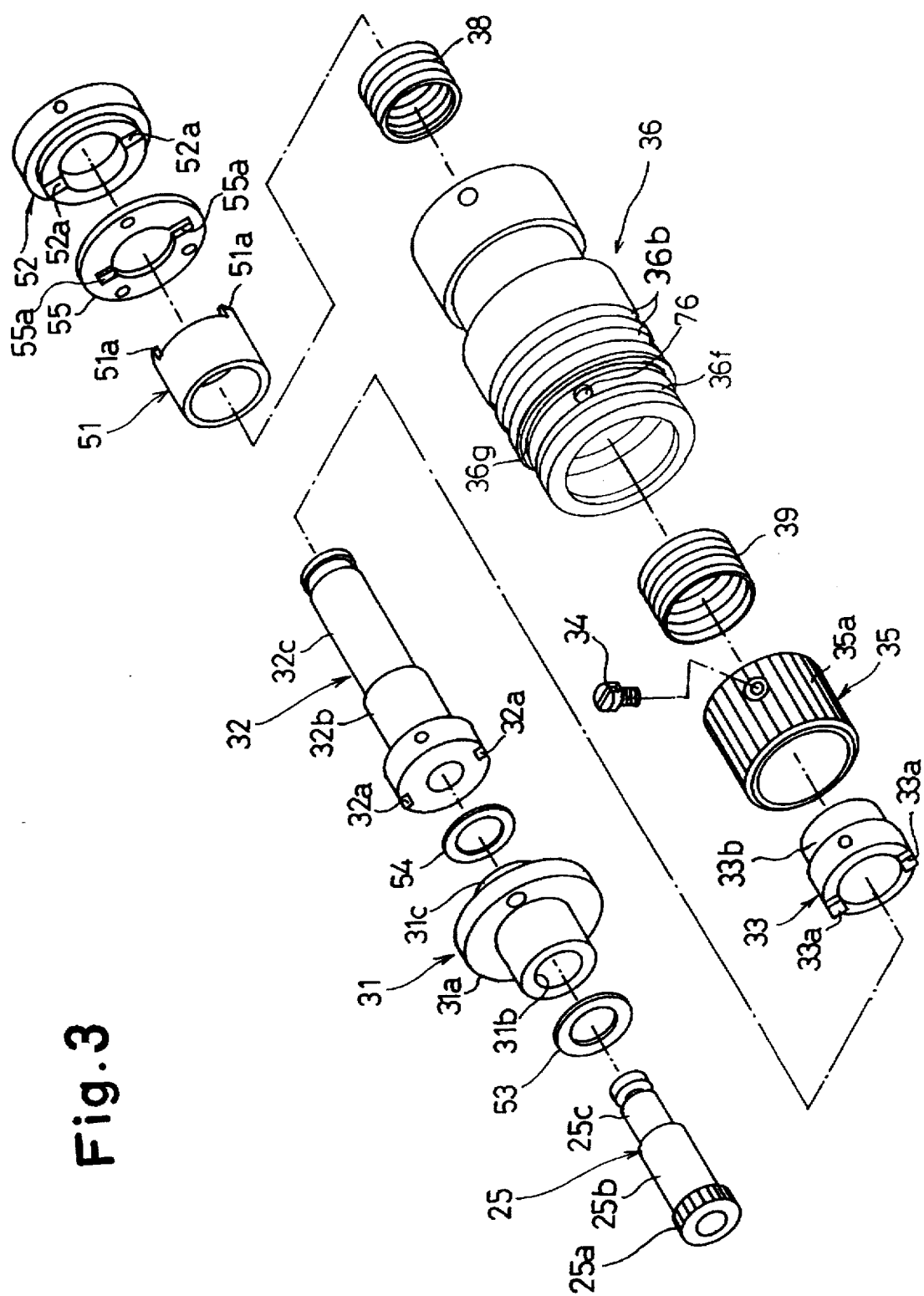
FIG. 3 is an exploded perspective view of the focusing apparatus shown in FIG. 1.
Figure 4:
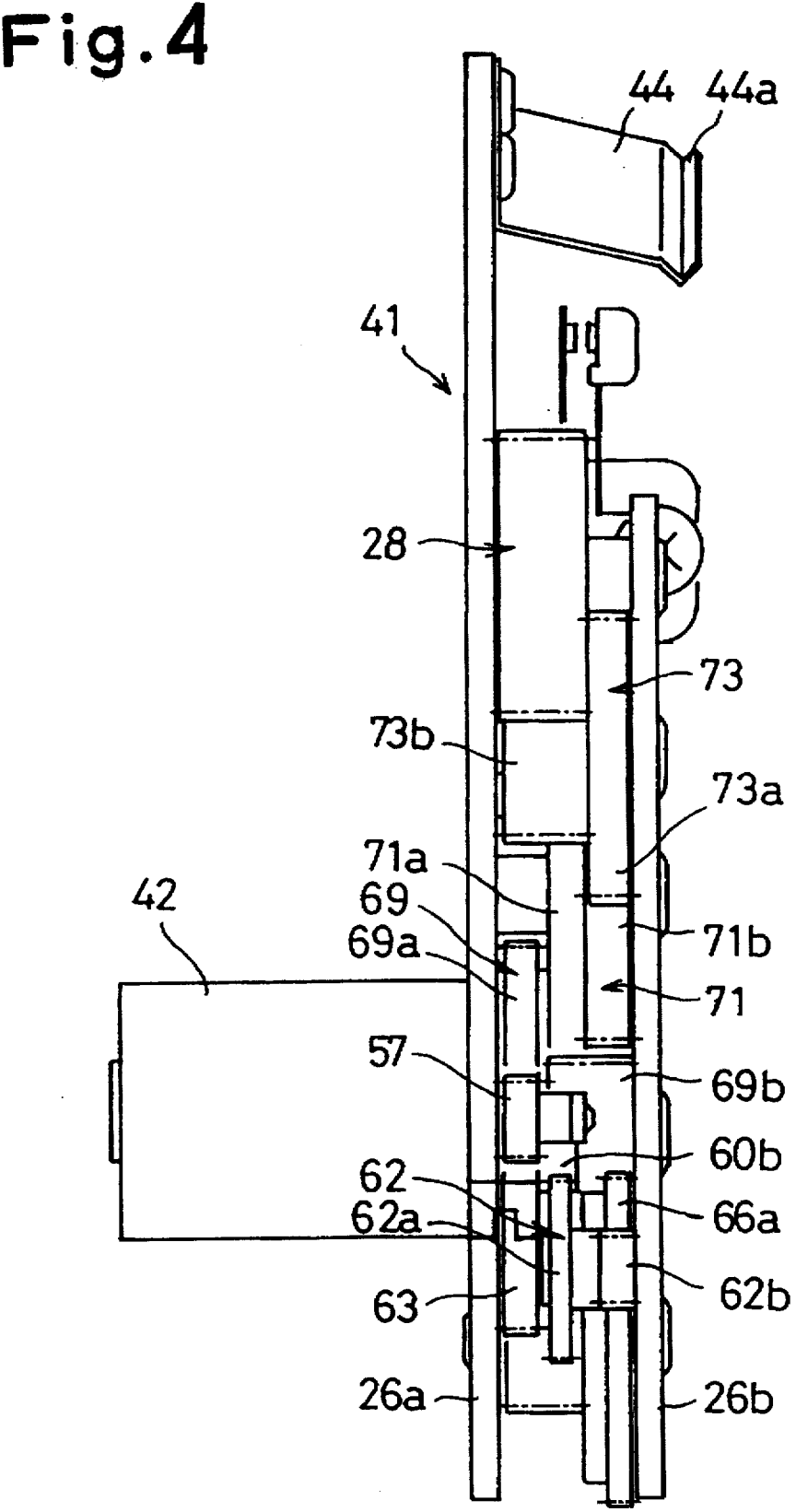
FIG. 4 is a front elevational view of a reduction mechanism and a lens driving motor in the focusing apparatus shown in FIG. 1.

A small diameter shaft portion 25c, which projects toward the rear side of the support plate 26a through the bearing hole 31b of the bearing member 31, is coaxially inserted in and secured to a hollow portion 32d of a cylindrical clutch shaft 32. The clutch shaft 32 abuts at a front end thereof (left end in FIG. 1) against the rear end of the bearing member 31, through a washer 54, to prevent the axial movement of the clutch shaft 32. The clutch shaft 32 is provided on the peripheral edge, of the front end surface thereof, with a pair of diametrically opposed automatic clutch grooves 32a (FIG. 3). A large diameter portion 32b is connected to the automatic clutch grooves 32a, and a small diameter portion 32c is connected to the large diameter portion 32b. A cylindrical clutch member 52 (FIG. 3), having a pair of stepped portions 52a for manual clutch means, is screw-engaged with the rear end (right end in FIG. 1) of the clutch shaft 32. The stepped portions 52a are diametrically opposed on the front end of the clutch member 52.

A cylindrical clutch member 33 is slidably and coaxially fitted onto the outer peripheral portion of the large diameter portion 32b of the clutch shaft 32. The clutch member 33 is provided with a pair of automatic clutch teeth (pawls) 33a which are diametrically opposed and are disengageably engaged with the corresponding automatic clutch grooves 32a. Together the clutch grooves 32a and the clutch teeth 33a constitute an automatic adjusting clutch. The clutch member 33 is also provided with a stepped portion 33b, behind the automatic clutch teeth 33a, which is biased by a compression spring 39.

A clutch member 51 is slidably and coaxially fitted onto the small diameter portion 32c of the clutch shaft 32. The clutch member 51 is provided with a pair of manual clutch teeth (pawls) 51a which are diametrically opposed and are disengageably engaged with the corresponding stepped portions 52a of the clutch member 52 to constitute a manual adjusting clutch. The clutch member 51 is provided with a stepped portion 51b, in front of the manual clutch teeth 51a, which is biased by a compression spring 38.

An annular member 35 is secured to the outer peripheral surface of the clutch member 33 by a set screw 34 so as to cover the automatic clutch grooves 32a and the automatic clutch teeth 33a. The annular member 35 is provided on the outer peripheral surface thereof with a gear (an outer peripheral gear) 35a. The outer peripheral gear 35a remains in mesh with the transmission gear 28 not only when the annular member 35 is moved to the manual adjustment position shown in FIG. 2, but also when the annular member 35 is moved to the automatic adjustment position shown in FIG. 1.

A substantially cylindrical focusing knob 36 having a handle or grip 23 (FIG. 1) at the rear end thereof, is fitted onto the outer peripheral surface of the clutch shaft 32 to cover the annular member 35, the clutch member 51 and the clutch member 52. The focusing knob 36 is provided with an inner peripheral flange 36a, which slidably comes into contact with the small diameter portion 32c of the clutch shaft 32, and which separates the clutch members 33 and 51. The front and rear end walls of the inner peripheral flange 36a are respectively pressed by the compression springs 39 and 38. The focusing knob 36 is also provided with an inner peripheral flange 36h from which the annular member 35 projects forward and which abuts against the inner peripheral edge of the set screw 34 when the focusing knob 36 is moved backward, and a hollow portion 36e in which the clutch member 52 is slidably fitted.

The focusing knob 36 is also provided with juxtaposed peripheral grooves 36f and 36g for respective manual and automatic adjustments, in each of which a click pawl 44a, formed at a front end of a click member 44 in the form of a leaf spring, can be engaged, and two engaging grooves 36b in which sealing O-rings 37 are fitted. The peripheral groove 36g for automatic adjustment is provided with at least one lateral engaging hole 76. An annular seal member (not shown) is secured to the support plates 26a and 26b to cover the focusing knob 36, and extends from the periphery of the support plates 26a, 26b to substantially a center of the focusing knob 36. The inner peripheral surface of the annular seal member contacts with the O-rings 37 to establish a watertight state for the reduction gear mechanism 41 and the inside of the focusing knob 36. The focusing knob 36 is provided, on the portion thereof corresponding to the manual clutch teeth 51a, with a disc member 55 having slots 55a (FIG. 3) through which the manual clutch teeth 51a project rearward by a predetermined length so as to restrict a relative rotation of the clutch member 51 with respect to the clutch shaft 32. The peripheral groove 36f for manual adjustment, the peripheral groove 36g for automatic adjustment, the click member (leaf spring) 44, and the click pawl 44a constitute a click stop mechanism.

The auto-level 10 has a selection switch (not shown) which is actuated to supply the AF controller 49 and the lens driving motor 42 with electric power, when the focusing knob 36 is moved to the automatic adjustment position shown in FIG. 1. When the focusing knob 36 is moved to the manual adjustment position shown in FIG. 2, the power supply to the AF controller 49 and the lens driving motor 42 is stopped.

In the auto-level 10, object light reflected from the reference pole B is converged onto the equivalent surface 14C through the objective lens group 11, the focusing lens 12, the horizontal plane establishing optical system 13, and the beam splitter 18 to form an object image. Even if the optical axis of the surveyor's telescope 8 is not in a horizontal plane, the horizontal plane establishing optical system 13 ensures that a horizontal fine line of the reticle plate 14 lies real horizontal. Consequently, when the surveyor's telescope 8 is rotated about the vertical axis 17X, to view another reference point, the new reference point is in the horizontal plane that includes the original reference point. Thus, an operator can view the object image formed on the equivalent surface 14C through the eyepiece 15.

When the focusing knob 36 is moved to the automatic adjustment position shown in FIG. 1, if the object light split by the beam splitter 18 is made incident upon the focus detecting sensor 21 through the equivalent surface 14C, the focus state detecting portion 48 calculates the amount of defocus for the image of the reference pole B, in accordance with the signal from the line sensor 21c, to thereby detect the focus state, i.e. , "focused", "not focused", "front focus", or "rear focus". The detection data thus obtained is supplied to the CPU 47, which sends the lens drive signal through the motor driver 45 to rotate the lens driving motor 42.

The rotation of the lens driving motor 42 is transmitted to the transmission gear 28, through the gears of the reduction gear mechanism 41, and then transmitted to the clutch member 33, through the outer peripheral gear 35a of the annular member 35. Consequently, the rotation is transmitted from the automatic clutch teeth 33a, which are in mesh with the automatic clutch grooves 32a, to the clutch shaft 32, so that the rotating shaft member 25, to which the clutch shaft 32 is secured, is rotated together with the pinion 25a. Thus, the guide member 22, to which the rotation of the pinion 25a is transmitted through the rack 22a, is moved in the optical axis direction O to move the focusing lens 12 to a position at which an in-focus state can be achieved. During this movement of the focusing lens 12, the encoder pulse detector 46 continues to feed the position of the focusing lens 12 back to the CPU 47 in accordance with the pulse signals received from the encoder 40. The CPU 47 controls the lens driving motor 42 to stop the focusing lens 12 at a position where the image of the reference pole B is in-focus on the equivalent surface 14C. The manual clutch teeth 51a are disengaged from the stepped portions 52a for manual clutch means, in the automatic focus control mode (position) as shown in FIG. 1, and hence no rotation of the clutch shaft 32 is transmitted to the focusing knob 36. Consequently, no rotation of the O-rings 37 takes place on the inner peripheral surface of the above-noted annular seal member (not shown). As a result, not only can the service life of the seal member (or the O-rings 37) be increased, but also the power consumption of the lens driving motor 42 (whose torque is small) can be reduced. Moreover, even if an external force is applied to the focusing knob 36 in the automatically focused state, the focusing operation is less influenced (by the force).

Since the peripheral end of the click pawl 44a is engaged in the engaging hole 76, no rotation of the focusing knob 36 occurs upon focusing. As can be understood from the foregoing, the click pawl 44a functions to determine the axial position of the focusing knob 36 and prevent the rotation thereof in the automatic focus control mode.

When the grip 23 is pulled to switch from the automatic focus control mode to the manual focus control mode, the focusing knob 36 is moved in the right direction in FIG. 1 along the axis "A". Consequently, the above-mentioned selection switch (not shown) is actuated to stop the power supply to the AF controller 49 and the lens driving motor 42, and the click pawl 44a is engaged with the peripheral groove 36f for manual adjustment. At the same time, the set screw 34 is pulled in the right direction in FIG. 1 by the inner peripheral flange 36h, and hence, the annular member 35 moves together with the clutch member 33 in the same direction against the compression spring 39.

As a result, the automatic clutch teeth 33a are disengaged from the automatic clutch grooves 32a to disengage the automatic clutch, and the manual clutch teeth 51a elastically engage with the stepped portions 52a for manual clutch means. Note that the manual clutch teeth 51a are not always opposed to the stepped portions 52a for manual clutch means. However, even if the manual clutch teeth 51a are not opposed to the stepped portions 52a and are brought into elastic contact with the portions of the clutch member 52 other than the stepped portions 52a, when the grip 23 is actuated to rotate the focusing knob 36, the relative position between the manual clutch teeth 51a and the stepped portions 52a changes, so that the manual control clutch can be engaged, as shown in FIG. 2.

When the operator rotates the focusing knob 36 through the grip 23, the rotation of the focusing knob 36 is transmitted to the clutch member 52 from the clutch member 51, whose rotation relative to the focusing knob 36 is restricted by the disc member 55. Consequently, the rotating shaft 25 is rotated through the clutch shaft 32 secured to the clutch member 52. As a result, the rotation is transmitted from the pinion 25a to the guide member 22 through the rack 22a, as a linear movement, so that the focusing lens 12 is moved in the optical axis direction O. The operator appropriately rotates the grip 23 (focusing knob) while viewing the object through the eyepiece 15 to form a focused object image B onto the reticle plate 14.

Figure 2:
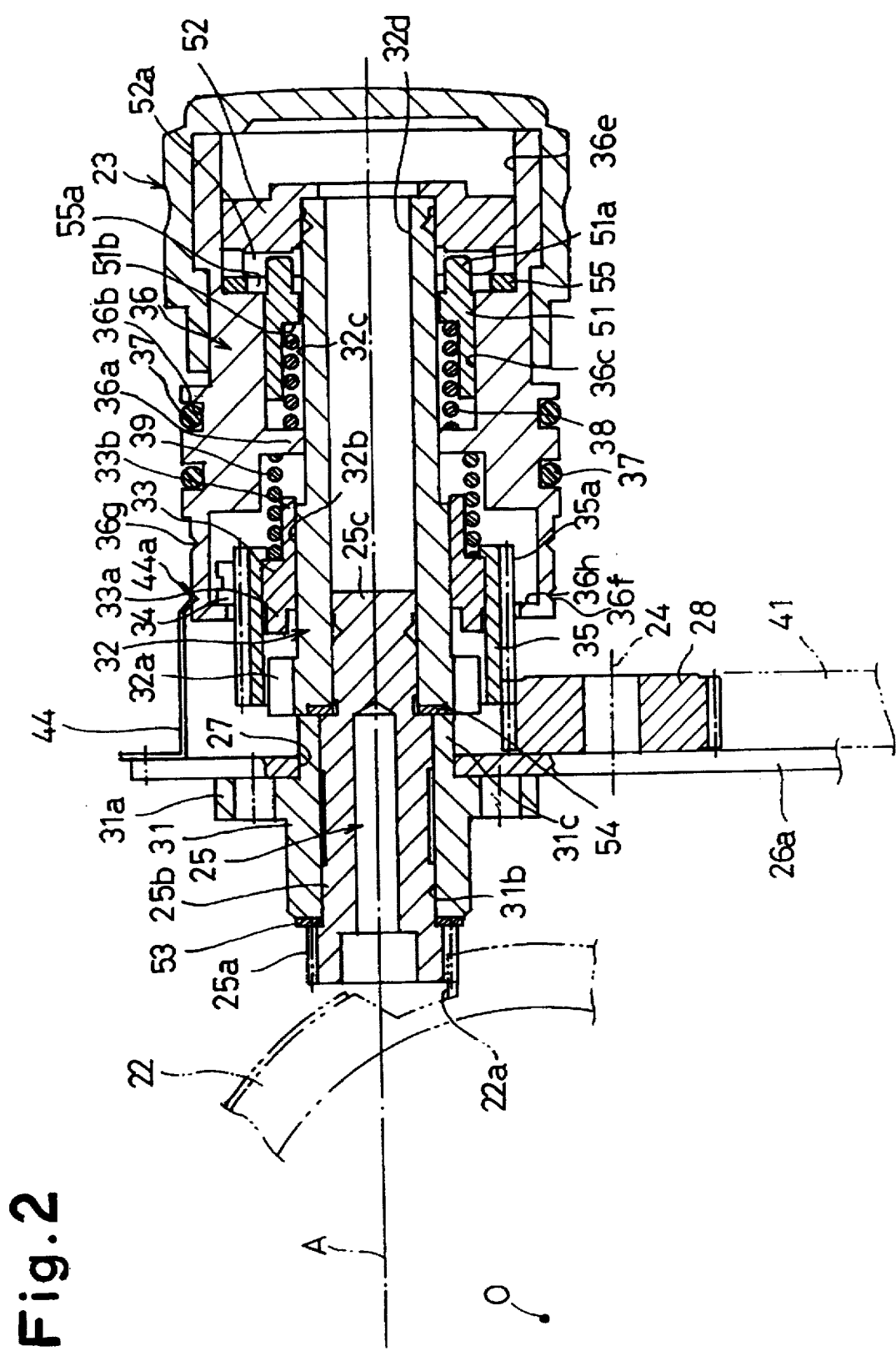
FIG. 2 is a sectional view of main elements of the focusing apparatus shown in FIG. 1, in a manual adjustment mode.

When the grip 23 is pushed in the left direction in FIG. 2, to return the control mode from the manual mode to the automatic mode, the automatic clutch teeth 33a are moved in the axial direction by the compression spring 39, regardless of the angular position thereof relative to the automatic clutch grooves 32a, similar to the movement of the clutch member 41 to the manual control position. Consequently, the focusing knob 36 is moved in the axial direction regardless of the angular position of the automatic clutch teeth 33a relative to the automatic clutch grooves 32a. During the movement of the automatic clutch teeth 33a, the manual clutch teeth 51a of the clutch member 51 are disengaged from the stepped portions 52a by the disc member 55, which moves together with the focusing knob 36, so that the manual control clutch is disengaged.

In this state, if the focusing operation is commenced by the AF controller 49, the rotation of the lens driving motor 42 is transmitted to the outer peripheral gear 35a and the automatic clutch teeth 33a, from the transmission gear 28. Even if the automatic clutch teeth 33a are not engaged by the automatic clutch grooves 32a, since the relative position thereof to the automatic clutch grooves 32a changes due to the rotation of the automatic clutch teeth 33a, the automatic clutch teeth 33a are engaged in the automatic clutch grooves 32a when the angular position of the former is registered with the angular position of the latter. Consequently, the rotation of the lens driving motor 42 is transmitted to the guide member 22 as a linear movement through the automatic clutch grooves 32a and the rotating shaft member 25.

As can be seen from the foregoing, due to the compression springs 39 and 38, the switching operation, between the automatic focus control mode and the manual focus control mode, is carried out by axially moving the focusing knob 36 by a predetermined amount, regardless of the angular positions of the clutch members 33 and 51. Accordingly, the selection of the automatic control mode and the manual control mode can be very smoothly effected.

Furthermore, since the automatic adjustment clutch and the manual adjustment clutch are provided on the same axis "A" and are selectively brought into an operative position (engagement) and an inoperative position (disengagement) by the movement of the movable members thereof in the axial direction, the space for accommodating the clutches can be made small, thus resulting in a compact focusing apparatus.

Since the axis of the focusing knob 36 and the rotating shaft member 25 is substantially perpendicular to the optical axis O of the optical system, if the focusing knob 36 is located substantially at the center of the auto-level 10 in the longitudinal direction, the center of gravity is located substantially at the center of the auto-level 10. Consequently, little or no operation force acts on the portions of the auto-level 10, other than the center of gravity thereof, during the operation of the focusing knob 36, and thus the auto-level 10 can be easily held horizontally. Moreover, since the focusing lens 12 is provided with the rack 22a which extends in the direction substantially parallel with the optical axis O of the optical system, and the rotating shaft 25 is provided with the pinion 25a which is in mesh with the rack 22a, the transmission mechanism which effectively transmits the rotation of the focusing knob 36 to the focusing lens 12 can be simplified.

In the illustrated embodiment, both the automatic adjustment clutch and the manual adjustment clutch are mechanical clutches. Alternatively, if at least one of the adjustment clutches is a friction clutch, the time necessary for transmission of the rotation can be shortened. Namely, the rotation can be immediately transmitted when the clutch is connected.

Although the axis "A" of the focusing knob 36 (rotating shaft 25) is perpendicular to the optical axis O of the optical system in the above-mentioned embodiment, the present invention is not limited thereto. Namely, the engagement mechanism constituted by the pinion 25a and the rack 22a can be replaced with another engaging means in which the axis "A" is not perpendicular to the optical axis O.

Figure 12:
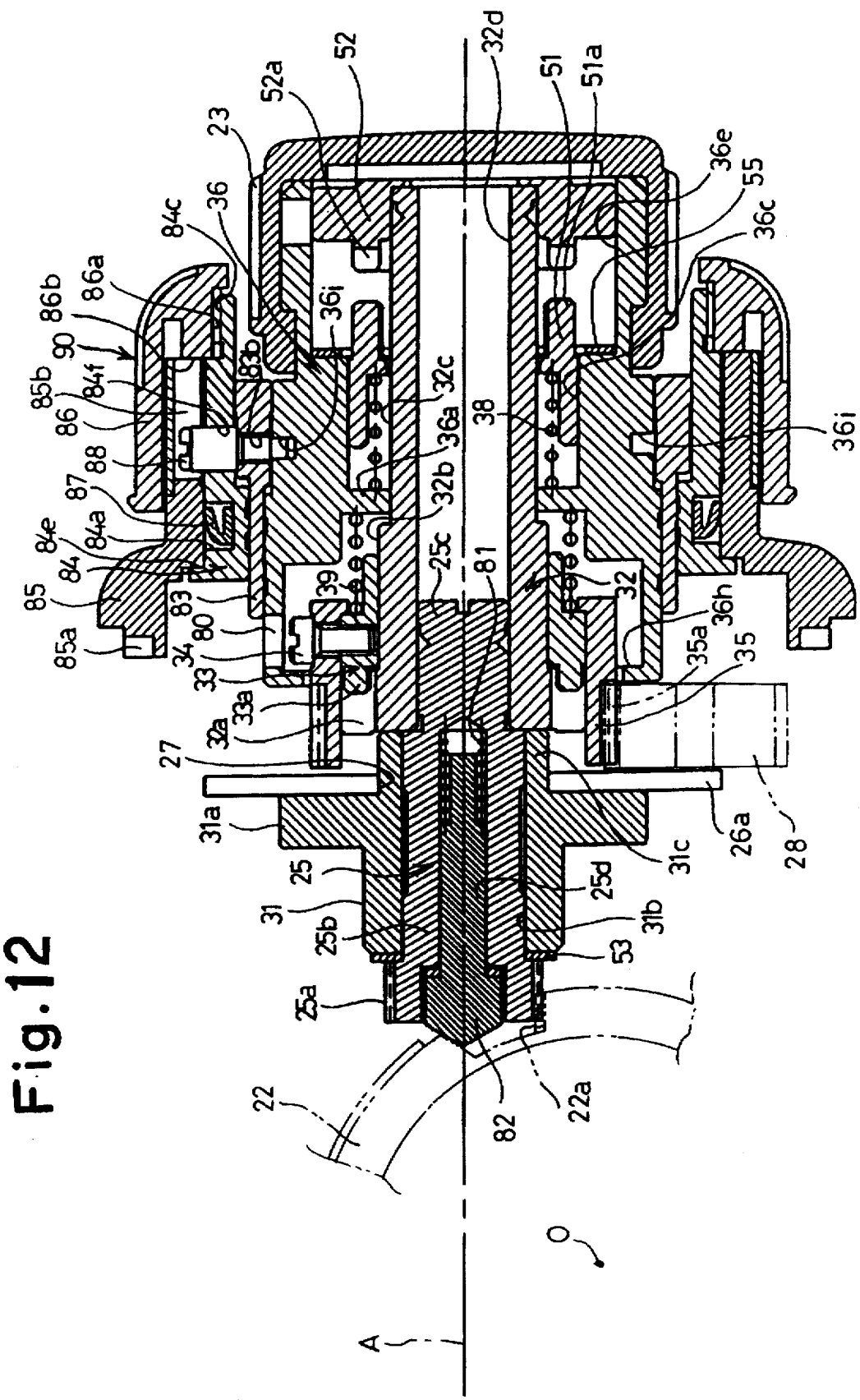
FIG. 12 is a sectional view of a second embodiment of a focusing apparatus according to an aspect of the present invention, in an automatic adjustment mode.
Figure 13:
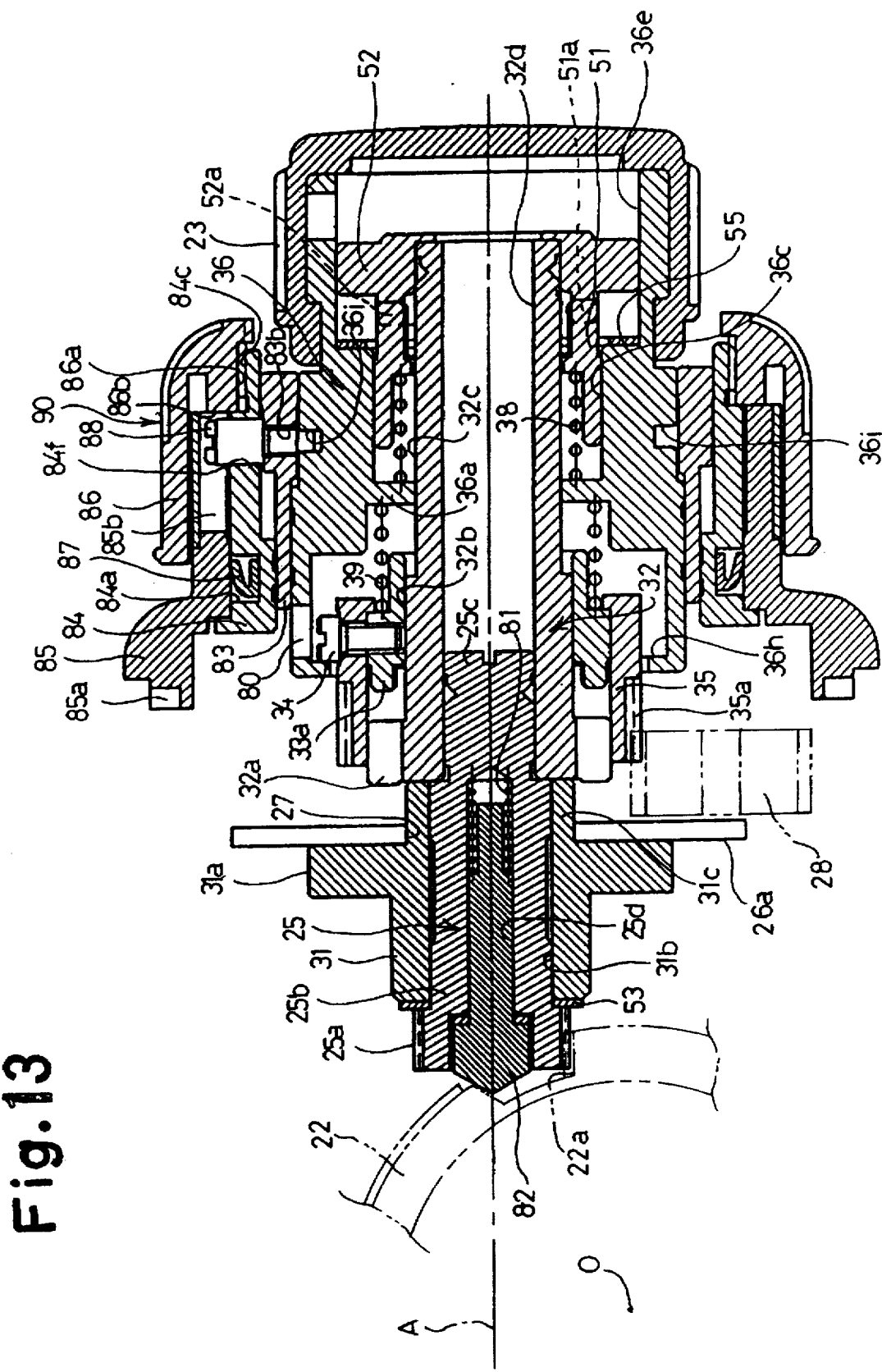
FIG. 13 is a sectional view of main elements of the focusing apparatus shown in FIG. 12, in a manual adjustment mode.

FIGS. 12 and 13 show a second embodiment of a focusing apparatus according to the present invention. FIGS. 12 and 13 show a focusing apparatus in an automatic adjustment position (automatic control mode) and a manual adjustment position (manual control mode), respectively. In FIGS. 12 and 13, the elements corresponding to those in the first embodiment are designated with like reference numerals and no duplicate explanation thereof will be given hereinafter.

The second embodiment differs from the first embodiment in the following areas. Namely, in the focusing apparatus of the first embodiment, the grip 23 is held by the operator to move the focusing knob 36 in the axial direction to thereby switch the adjustment mode between the automatic control mode and the manual control mode. Therefore, there is a possibility that this force acts on the lens barrel 19 to rotate the same on the rotatable table 17 during the switching operation. If this occurs, an accidental rotation of the surveyor's telescope 8 on the lens barrel 19 takes place, so that the object which is being viewed moves out of the field of view. Moreover, if the focusing knob 36 is rotated during the switching operation, the object is out of focus.

To solve this problem, in the second embodiment, a focusing knob moving mechanism 90 is provided to move the focusing knob 36 in the axial direction. The focusing knob moving mechanism 90 comprises a first cylindrical member 83, fitted onto the outer peripheral surface of the focusing knob 36, so as to relatively rotate, and a second cylindrical member 84, fitted onto the outer peripheral surface of the first cylindrical member 83, as shown in FIG. 12. The focusing knob 36 is provided on the outer peripheral surface thereof with a peripheral groove 36i perpendicular to the axis "A". The first cylindrical member 83 is provided with a radially extending threaded through hole 83b, in which a linear movement key screw 88 is screwed. The front end of the key screw 88, projecting into the inside of the first cylindrical member 83, is slidably fitted in the peripheral groove 36i of the focusing knob 36. Consequently, the focusing knob 36 is movable together with the first cylindrical member 83 in the axial direction "A" and is rotatable relative to the first cylindrical member 83.

A cylindrical supporting member 85, secured to the body of the auto-level 10 (i.e., the body of the surveying instrument), is fitted onto the outer peripheral surface of the second cylindrical member 84 to be in sliding contact, at the inner peripheral surface thereof, with the outer peripheral surface of the second cylindrical member 84. The second cylindrical member 84 is provided on the outer peripheral surface thereof with a peripheral groove 84a in which an annular seal member 87 is fitted to establish a watertight connection between the cylindrical support 85 and the second cylindrical member 84.

A rotatable switching member 86 is rotatably fitted onto the second cylindrical member 84. The switching member 86 is provided on the inner peripheral surface thereof with a female-threaded portion 86a which is in mesh with a male-threaded portion 84c formed on the outer peripheral surface of the end of the second cylindrical member 84, so that the switching member 86 and the second cylindrical member 84 are rotatable and movable together about the axis "A" and in the direction of the axis "A".

The second cylindrical member 84 is provided on the outer peripheral surface thereof with an outer flange 84e. The outer flange 84a abuts against the inner end of the cylindrical support 85. The stepped inner portion 86b of the switching member 86 abuts against the axial end (right end in FIG. 12) of the cylindrical support 85. Thus, the switching member 86 is rotatable relative to the focusing knob 36, but is not movable in the axial direction "A". Consequently, when the switching member 86 is rotated, the second cylindrical member 84 rotates together therewith about the axis "A".

Figure 14:
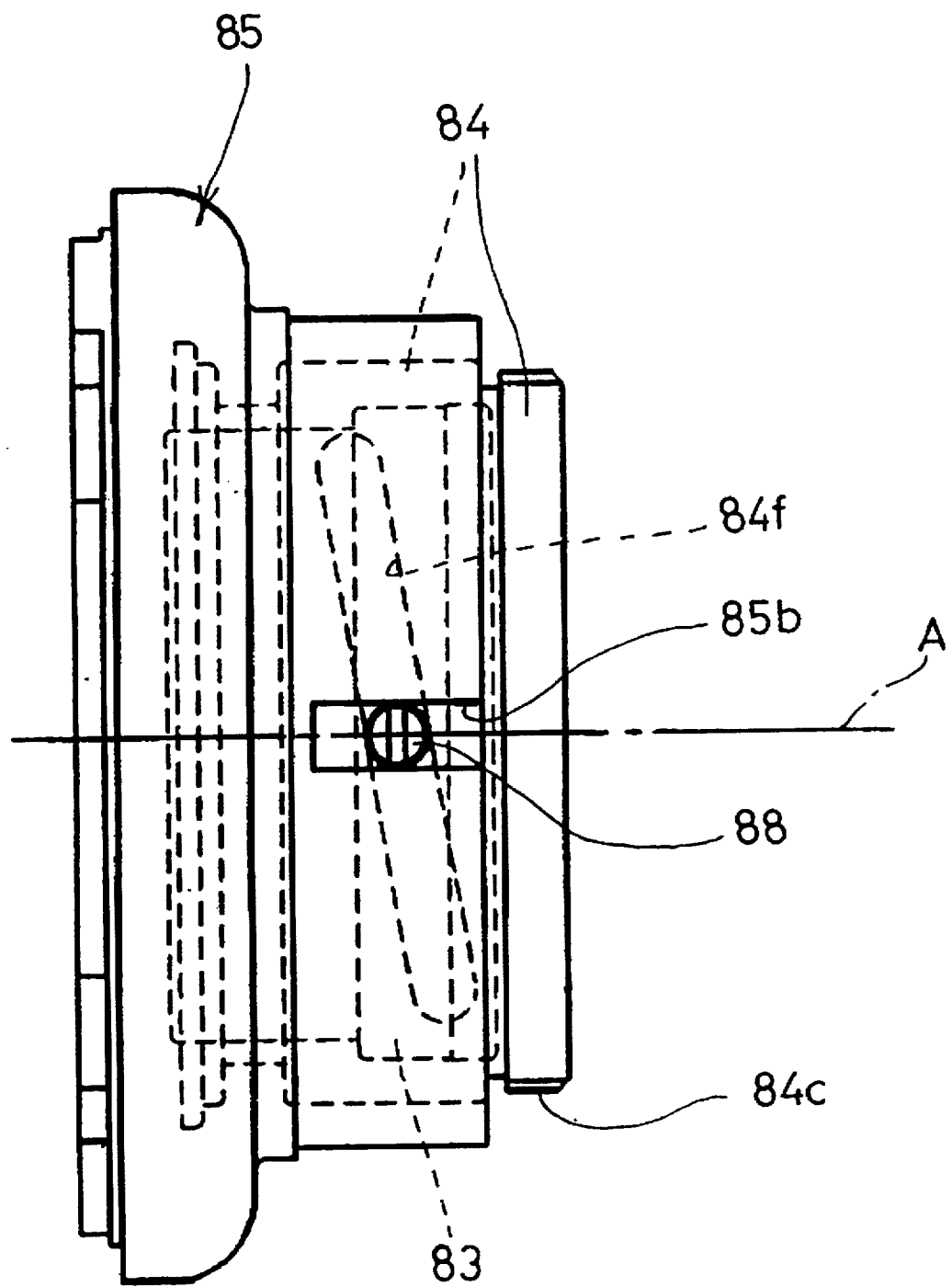
FIG. 14 is a plan view of main elements of the focusing apparatus shown in FIG. 12; and, FIG. 15 is a schematic view of a horizontal plane establishing optical system in the auto-level shown in FIG. 10.

The cylindrical support 85, secured to the body of the auto-level 10, is provided with a linear movement guide groove 85b which extends in parallel with the axis "A", and a linear movement key screw 88, whose axial position relative to the focusing knob 36 is fixed, which is slidably fitted in the guide groove 85b. The guide groove 85b has at least a length which corresponds to the displacement of the linear movement key screw 88 (i.e., a member to be guided) which is caused by the rotation of the switching member 86. The second cylindrical member 84 is provided with a lead groove 84f (FIG. 14), which extends therethrough in the radial direction, and which is inclined with respect to the axis "A" at a predetermined angle. The linear movement key screw 88 is slidably fitted in both the lead groove 84f and the linear movement guide groove 85b. The linear movement guide groove 85b, the lead groove 84f, and the linear movement key screw 88 constitute a movement converting mechanism which moves the focusing knob 36 in the axial direction "A".

The rotating shaft member 25 is provided with an axially extending insertion hole 25d, in which a shaft 82, having a sharp end, is slidably inserted. The shaft 82 is continuously biased by a compression spring 81, arranged in the insertion hole 25d, in the axial and forward direction (left direction in FIG. 12). The front end of the shaft 82 abuts against the peripheral portion of the rack 22a of the guide member 22 to absorb a play therebetween during the rotation of the pinion 25a.

In the focusing apparatus as constructed above, for example, when the switching member 86 is rotated about the axis "A" in the direction toward the manual control mode in a position shown in FIG. 12, the linear movement key screw 88, fitted in the linear movement guide groove 85b and the lead groove 84f, is moved in the right direction in FIG. 12 in accordance with the relationship between the linear movement guide groove 85b and the lead groove 84f. As a result, the first cylindrical member 83 and the focusing knob 36 are moved together in the same direction, so that the selection switch (not shown) is switched to stop the power supply to the AF controller 49 and the lens driving motor 42. At the same time, since the set .screw 34 is pulled by an inner flange 36h in the right hand direction, the annular member 35 is moved together with the clutch member 33 in the same direction. Consequently, the associated movable elements are moved in the same fashion as the first embodiment, so that the automatic adjustment clutch is disconnected and instead, the manual adjustment clutch is connected (FIG. 13). Since the linear movement key screw 88, whose rotation about the axis "A" is restricted by the linear movement guide groove 85b, is slidably fitted in the peripheral groove 36i of the focusing knob 36 as mentioned above, the focusing knob 36 is free to rotate with respect to the linear movement key screw 88, and hence, the focusing knob 36 can be rotated about the axis "A" in an optional direction in the manual control position.

In FIG. 13, when the switching member 86 is rotated about the axis "A" in the direction toward the automatic control position, the linear movement key screw 88 is moved in the left direction along the axis "A", in accordance with the relationship between the linear movement guide groove 85b and the lead groove 84f. Consequently, the focusing knob 36 is moved together with the first cylindrical member 83 in the same direction, so that the selection switch (not shown) is switched to commence the power supply to the AF controller 49 and the lens driving motor 42. At the same time, the disc member 55, which is moved together with the focusing knob 36 in the left hand direction, moves the clutch member 51 in the same direction to thereby disengage the manual clutch teeth 51a from the stepped portions 52a for manual clutch means. As a result, the manual adjustment clutch is disconnected. Moreover, the clutch member 33 is moved by the biasing force of the compression spring 39 in the left hand direction, in accordance with the movement of the focusing knob 36 in the same direction, so that the automatic clutch teeth 33a are engaged by the automatic clutch teeth 32a. As a result, the automatic adjustment clutch is connected (FIG. 12).

As can be understood from the above discussion, in the second embodiment, the selection of the adjustment mode can be carried out, not directly by the axial movement of the focusing knob 36 (caused by the axial movement of the grip 23 by the manual operation), but indirectly by the rotational movement of the rotatable switching member 86. Consequently, there is little chance that any force acts on the lens barrel 19 to rotate the same on the rotatable plate 17 when the adjustment mode is switched. Also, there is no fear that the focusing knob 36 will accidentally rotate. Thus, no accidental rotation of the surveyor's telescope 8 on the lens barrel 19, which causes the object which is being viewed to move out of the field of view or the object to be out of focus, occurs.

As may be understood from the above discussion, according to an aspect of the present invention, the automatic adjustment mode and the manual adjustment mode can be selected in accordance with need, and the selection can be easily and certainly effected by the axial movement of the focusing knob.

Furthermore, according to another aspect of the present invention, there is no chance that the object which is being viewed moves accidentally out of the field of view, or the object which has been in the focused state is out of focus.

What is claimed is:

1. A focusing apparatus for a surveying instrument including an objective lens, a focusing lens, and a reticle, in which said focusing lens is movable to form an image of an object on said reticle, comprising:

a motor which drives said focusing lens in an optical axis direction;

means for detecting a focus state of the image of an object and for controlling said motor in accordance with said detected focus state;

a rotating shaft member rotated by a rotation of said motor to thereby move said focusing lens in the optical axis direction;

a focusing knob which is coaxial with said rotating shaft member and movable in an axial direction thereof; and a plurality of clutches which disengageably engage one of said focusing knob and said motor with said rotating shaft member, according to an axial movement of said focusing knob.

2. The focusing apparatus for a surveying instrument according to claim 1, wherein said plurality of clutches comprises a first clutch and a second clutch, said first clutch being used for an automatic focusing adjustment, and said second clutch being used for a manual focusing adjustment.

3. The focusing apparatus for a surveying instrument according to claim 2, wherein when said focusing knob is moved in one axial direction, said first clutch disengages said focusing knob from said rotating shaft member and engages said motor with said rotatable shaft member, and further wherein when said focusing knob is moved in another axial direction, said second clutch disengages said motor from said rotatable shaft member and engages said focusing knob with said rotatable shaft member.

4. The focusing apparatus for a surveying instrument according to claim 1, wherein said axis of said focusing knob and said rotating shaft member is substantially perpendicular to the optical axis, and wherein said focusing lens is provided with a rack which extends in a direction substantially parallel to the optical axis, said rack meshing with a pinion provided in said rotating shaft member.

5. The focusing apparatus for a surveying instrument according to claim 3, wherein said first clutch is provided with a first clutch portion and a first clutch tooth portion, coaxial with said focusing knob, said first clutch portion and said first clutch tooth portion engaging and disengaging when said focusing knob is respectively moved in said one axial direction and said another axial direction.

6. The focusing apparatus for a surveying instrument according to claim 5, wherein said second clutch is provided with a second clutch portion and a second clutch tooth portion, coaxial with said focusing knob, said second clutch portion and said second clutch tooth portion engaging and disengaging when said focusing knob is respectively moved in said another axial direction and said one axial direction.

7. The focusing apparatus for a surveying instrument according to claim 6, wherein said first and said second clutch tooth portions are respectively biased toward said first and second clutch portions by respective first and second springs.

8. The focusing apparatus for a surveying instrument according to claim 1, wherein at least one of said plurality of clutches is a friction clutch.

9. The focusing apparatus for a surveying instrument according to claim 2, further comprising a click stop mechanism which engages said focusing knob at one of an automatic adjustment position in which said first clutch engages and a manual adjustment position in which said second clutch engages.

10. The focusing apparatus for a surveying instrument according to claim 9, wherein said click stop mechanism comprises two adjacent click grooves provided on an outer peripheral surface of said focusing knob and two corresponding click pawls which are engaged in the click grooves when said focusing knob is moved in said axial direction.

11. The focusing apparatus for a surveying instrument according to claim 10, wherein one of said click grooves in which one of said corresponding click pawls is engaged in said automatic adjustment position is provided with at least one hole in which said click pawl can be engaged.

12. The focusing apparatus for a surveying instrument according to claim 1, further comprising focusing knob moving means for moving said focusing knob in said axial direction.

13. The focusing apparatus for a surveying instrument according to claim 12, wherein said focusing knob moving means comprises a cylindrical rotation switching member, and a movement converting mechanism which converts the rotation of said rotation switching member into a linear movement of said focusing knob.

14. The focusing apparatus for a surveying instrument according to claim 13, wherein said cylindrical rotation switching member is rotatable relative to said focusing knob and is immovable in said axial direction.

15. The focusing apparatus for a surveying instrument according to claim 13, wherein said movement converting mechanism comprises a linear movement guide groove provided on a body of said surveying instrument and extending in said axial direction of said focusing knob, a lead groove provided on said rotation switching member and inclined with respect to said axial direction, and a member to be guided, movable in said axial direction together with said focusing knob, and fitted in said linear movement guide groove and said lead groove.

16. The focusing apparatus for a surveying instrument according to claim 15, wherein said focusing knob is provided, on an outer peripheral surface thereof, with a peripheral groove perpendicular to said optical axis direction, and wherein a cylindrical member is relatively rotatably fitted onto said focusing knob.

17. The focusing apparatus for a surveying instrument according to claim 15, wherein said member to be guided comprises a linear key screw which is screw-engaged with said cylindrical member, a front end of said linear key screw projecting into said cylindrical member so as to be slidably fitted in said peripheral groove.

18. The focusing apparatus for a surveying instrument according to claim 1, wherein said rotating shaft member is provided between said focusing lens and said motor.

19. The focusing apparatus for a surveying instrument according to claim 1, wherein said focusing knob is substantially cylindrical.

20. The focusing apparatus for a surveying instrument according to claim 1, wherein said objective lens, said focusing lens and said reticle are provided in respective order from said object.

21. A focusing apparatus for a surveying instrument including an objective lens, a focusing lens, a reticle and an eyepiece, for adjusting a position of said focusing lens along an optical axis thereof to bring an image of an object into focus on said reticle, said focusing apparatus comprising:

means for detecting a focus state of said object image relative to said reticle;

a motor for driving said focusing lens along said optical axis;

a rotating shaft member rotated by said motor to move said focusing lens along said optical axis;

means for controlling said motor in accordance with said focus state detected by said detecting means;

a focusing knob which is coaxial with said rotating shaft member and movable in an axial direction thereof; and a plurality of clutches which disengageably engage one of said focusing knob and said motor with said rotating shaft member, according to an axial movement of said focusing knob.

22. A level having a focusing apparatus for adjusting a position of a focusing lens of a telescope, provided on said level, along an optical axis thereof to bring an image of an object observed through said telescope into focus, said focusing apparatus comprising:

means for detecting a focus condition of said object image;

a motor for driving said focusing lens along said optical axis;

a rotating shaft member rotated by said motor to move said focusing lens along said optical axis;

means for controlling said motor in accordance with said focus state detected by said detecting means;

a focusing knob which is coaxial with said rotating shaft member and movable in an axial direction thereof;

a first clutch which disengages said focusing knob from said rotating shaft member and engages said motor with said rotating shaft member when said focusing knob is moved in one axial direction, so that said focusing lens can be controlled by said control means; and a second clutch which disengages said motor from said rotating shaft member and engages said focusing knob with said rotating shaft member when said focusing knob is moved in another axial direction, so that said focusing lens can be manually adjusted by said focusing knob.

* * * * *